Oct. 24, 1944.     M. H. GROVE     2,360,873
FLUID FLOW CONTROL DEVICE
Filed Sept. 13, 1943
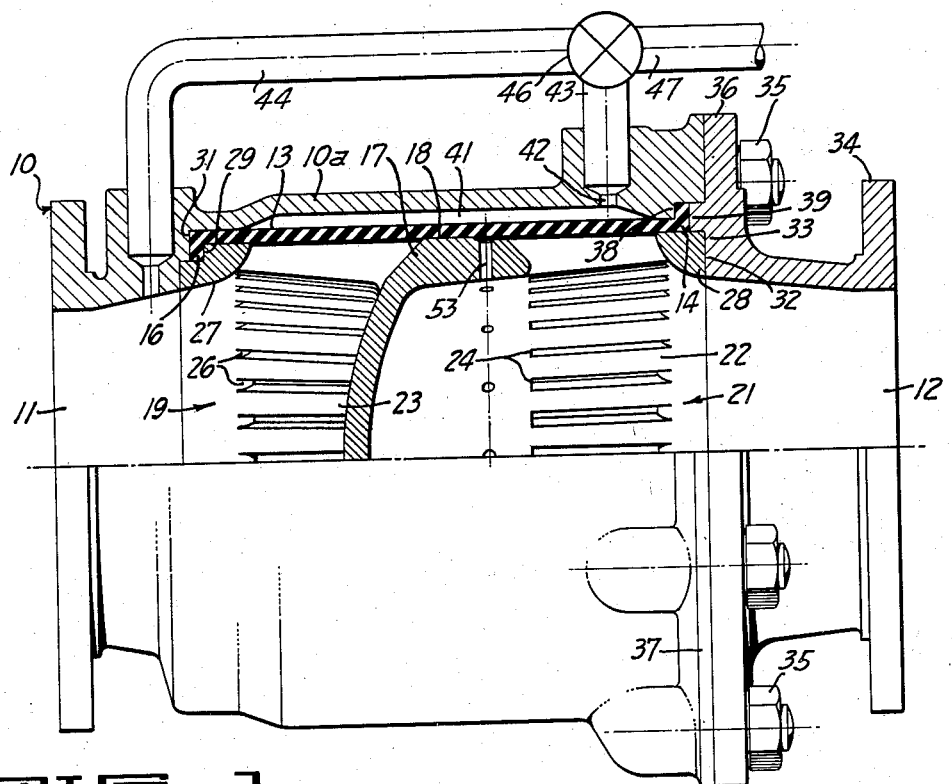
FIG_1_
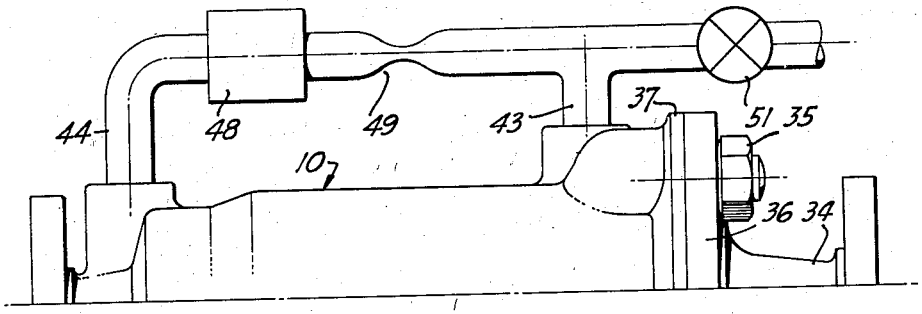
FIG_2_
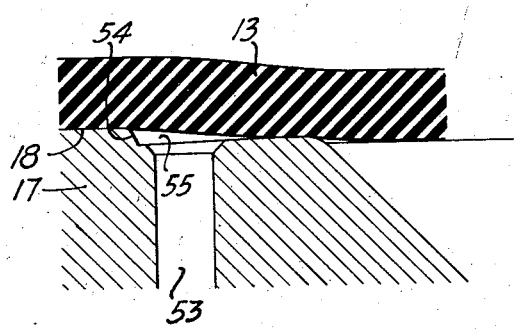
FIG_3_
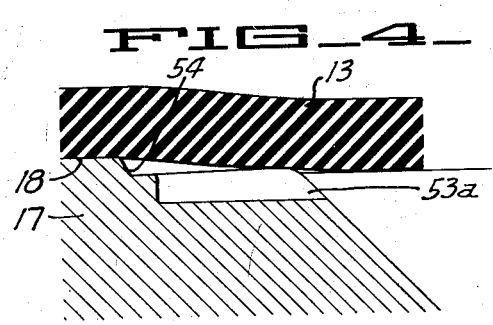
FIG_4_
INVENTOR
Marvin H. Grove.
BY
Paul D. Flehr
ATTORNEY Patented Oct. 24, 1944

2,360,873

UNITED STATES PATENT OFFICE 2,360,873

FLUID FLOW CONTROL DEVICE

Marvin H. Grove, Piedmont, Calif., assignor to Fluid Control Engineering Co., a copartnership consisting of Marvin H. Grove and Julia E. Grove, both of Piedmont, Calif.

Application September 13, 1943, Serial No. 502,174

4 Claims. (Cl. 137—139)

This invention relates generally to valves or like devices for controlling the flow of various fluids.

It is an object of the invention to improve upon the expansible tube type of valve disclosed in co-pending application Serial No. 464,496, filed November 4, 1942, now Patent No. 2,331,291, granted Oct. 12, 1943, for Fluid flow control device, particularly with respect to better adapting the same for certain types of service and certain operating conditions.

Briefly the valve disclosed in said co-pending application makes use of a body having inflow and outflow passages, with a tube of resilient rubber or like material disposed within the body and having its ends sealed with respect to the body about the passages. A circularly contoured barrier is disposed within the tube intermediate the ends of the same, and this barrier has a peripheral surface upon which the tube may engage and seal. Grid portions or like means extend from the opposite sides of the barrier and form abutments against inward collapsing of the tube. A fluid chamber is formed about the tube and by introducing fluid under pressure to this chamber, or by venting fluid from the same, the tube assumes closed or open positions with respect to the barrier. Tendency toward chattering, particularly when operating at relatively low inlet pressures, is entirely or largely overcome by providing the barrier with a series of relatively small passages, which communicate between the outflow side of the barrier and points on the periphery of the barrier located between the inflow and outflow edges of the same. Under certain conditions it has been found that where the controlling fluid pressure is taken from the inlet side of the valve, the pressure as actually applied about the expansible tube may be considerably less than the inlet pressure. This tends to cause a certain amount of leakage instead of providing a desired complete shut-off. For example this effect may be experienced if the control valve and associated piping are located and arranged so that the full pressure head on the inlet side cannot be applied in the pressure chamber about the tube, or so that air accidentally trapped in the control piping effectively reduces the available controlling pressure. The present invention tends to prevent leakage under the conditions just outlined and particularly makes possible a substantial differential between inflow pressure applied to the valve and pressure applied about the tube, without causing leakage.

Further objects and features of the invention will appear from the following description in which the preferred embodiment has been set forth in detail in conjunction with the accompanying drawing.

Referring to the drawing:

Figure 1 is a side elevational view, in quarter section, showing a valve incorporating the present invention.

Figure 2 is a view like Figure 1 but showing a different control arrangement for the valve.

Figure 3 is an enlarged cross-sectional detail illustrating the preferred construction for the barrier.

Figure 4 is an enlarged cross-sectional detail, similar to Figure 3, but showing a modification.

Referring to Figure 1 of the drawing, the device illustrated consists of a body 10 which is formed to provide fluid passages 11 and 12. It is assumed that passage 11 is connected by piping to a source of liquid under pressure, such as a centrifugal pump or gravity pressure tank, while outlet 12 discharges to the atmosphere or is connected by piping to a low pressure system. Within the body there is an expansible tube 13 formed of relatively resilient material such as resilient vulcanized rubber, or equivalent synthetic material like Buna-Hycar. The tube is preferably cylindrical in shape and has integral outturned and inturned flanges 14 and 16 respectively.

Within the tube 13 there is a barrier 17 which is circularly contoured and which has a peripheral surface 18 that is relatively smooth and adapted to effect a seal with respect to the adjacent portion of the expansible tube. To retain barrier 17 in proper position intermediate the ends of tube 13, and to prevent inward collapsing of the tube, the abutment grids 19 and 21 are provided. These grids can conveniently be made integral with barrier 17, and as illustrated they are formed of circumferentially spaced ribs or bars 22 and 23, whereby fluid may flow through the slots 24 and 26 between these ribs. The end portions of the grids form the annular ring portions 27 and 28. Ring portion 27 provides an annular face 29 opposed to the annular shoulder 31 formed on the body, whereby flange 16 can be squeezed between these spaces to provide the desired seal. Ring portion 28 has its end face 32 engaged by shoulder 33 formed on the separate body part 34. Body part 34 is clamped to the main body by suitable means such as bolt 35 engaging the adjacent flanges 36 and 37. It can be in the form of a flanged coupling as illustrated for making connection to outflow piping.

In order to seal flange 14 with respect to the body it is shown clamped between an annular shoulder 38 formed on the body, and the annular surface 39 formed on body part 34. It is desirable to form the peripheral surface 18 of the barrier 17 to a diameter somewhat greater than that of the grid bars 22 and 23, to facilitate machining.

About the tube 13 the body is formed to provide a closed annular fluid chamber 41. The wall 10a of body 10 which forms the outer wall of chamber 41, is annular in cross-section and has its surface so disposed as to form an abutment to limit expansion of tube 13.

Assuming that the device is to be used to control flow of liquid, such as water, salt water, chemical solutions, oil or the like, with the inflow pressure being applied to the chamber 41, connections can be made either as shown in Figure 1, or as in Figure 2. In Figure 1 a pipe 43 connects with a body and is in communication with chamber 41 through the restricted orifice 42. Another pipe 44 connects with the inflow side of the body, and is associated with pipe 43 through the control valve 46. By operating control valve 46, pipes 43 and 44 can either be placed directly in communication, or communication with pipe 44 can be interrupted while pipe 43 is connected to the venting pipe 47. In Figure 2 pipe 44 is shown provided with a screen 48 and a restricted controlling orifice 49. Beyond orifice 49 pipes 43 and 44 are connected together and pipe 43 may be vented to the atmosphere by opening the control valve 51. It will be understood that in either instance the control valve may be located a considerable distance from the main valve, as for example at a level well above the level of the main valve.

With the arrangement of Figure 1, operating the control valve 46 between open and closed position serves to either apply inflow liquid pressure to chamber 41, to cause a closing operation, or to vent chamber 41 to cause an opening operation. The same net effect is obtained by the arrangement of Figure 2, except that in this instance a small amount of liquid is continuously bled through the control valve 51 while the main valve remains closed.

The clearance about the periphery of the barrier, for full open position of the valve, is preferably made relatively small compared to the barrier diameter. For example in actual practice this clearance is from $\frac{1}{20}$ to $\frac{1}{22}$ of the diameter of the barrier. Substantially greater clearances can be used, such as $\frac{1}{6}$ the diameter of the barrier, but ratios as great as $\frac{1}{6}$ the diameter of the barrier tend to cause severe pulsations or chattering within pressure ranges such as normally encountered in installation of such devices, as for example from say 30 to 200 lbs. per square inch.

In addition to limiting the clearance about the barrier, as described above, the peripheral portion of the barrier is provided with a plurality of small circumferentially spaced openings 53. These openings are proportioned to afford in aggregate a relatively small cross-sectional flow area compared to the total flow area about the barrier when the tube is fully expanded.

Insofar as described above the valve is the same as disclosed in the aforementioned application Serial No. 464,496. Examples are set forth in said co-pending application with respect to dimensioning of the holes 53, in order to secure good results. These holes have a marked beneficial effect in minimizing chattering such as tends to occur at relatively low inflow pressures, as for example inflow pressures ranging from say 10 to 20 lbs. per square inch, which are not greatly in excess of the pressure required to expand the tube.

To provide the present invention the periphery of the barrier, in place of being a plain surface as in said co-pending application, is provided with a circular shoulder 54. In practice this shoulder is formed by turning down a portion of the periphery to a slightly smaller diameter, for that part of the periphery on the outflow side which is interrupted by the outer ends of the holes 53. In other words the shoulder is disposed in close proximity with the outer ends of these openings, and between these openings and the inflow edge of the barrier. While the height of this shoulder may vary, it may be of the order of $\frac{1}{32}$ of an inch for barriers ranging from say about 1½ to 13 inches in diameter.

The manner in which the tube 13 moves between open and closed positions, responsive to fluid pressure in chamber 41, has been described in the above mentioned co-pending application. In general when space 41 is vented to the atmosphere or to a low pressure system, inflow pressure expands the tube outwardly to provide a maximum clearance about the barrier. Conversely when inflow pressure is applied to chamber 41, the tube contracts to close upon the barrier, with final closing action comprising shutting off flow through the small holes 53. Figure 3 illustrates how with the present invention the final shut-off operation takes place upon the edge of shoulder 54, rather than upon the outer ends of holes 53 as in the aforesaid co-pending application. This makes possible a more positive and definite shut-off, because a seal is formed upon a smooth and circular edge. At the same time the rubber tube when in full closed position tends to bridge across an annular space 55 adjacent shoulder 54, and this bridged space is in communication with the outer ends of the small openings 53. As a result the force tending to press the rubber tube upon the edge of shoulder 54 is increased, particularly in that space 55 is vented to the outflow side. In other words for a given pressure within chamber 41, forces are more effectively applied to hold the tube in full closed position, without tendency toward leakage. In actual practice it has been found that the pressure in chamber 41 may drop considerably below that on the inflow side of the valve, without causing leakage in closed position, whereas under like conditions without the shoulder 54, leakage would result.

While proportioning of the parts may vary, the shoulder 54 should not be of such a height as to prevent the bridging effect described, in which the tube contacts the outflow edge of the barrier as well as the shoulder. Also this bridging effect should not permit flexing of the tube to such an extent as to close off the openings 53.

While more effective shut-off without leakage is a noticeable result of my improvement, it has also been found that valves made in this fashion seem to work smoother and seem to be free of all tendency toward chattering or pulsations. In other words there appears to be greater freedom from chattering or pulsating action for all pressures of operation, including pressures as low as the device is operable.

Figure 4 illustrates a modification, in which in place of utilizing circumferentially spaced openings 53 drilled through the barrier, relatively small grooves 53a are formed in the barrier, at circumferentially spaced intervals. These grooves afford a total cross-sectional area, comparable to the openings 53. Here again the valve is provided with the circular shoulder 54, in proximity with the adjacent ends of the grooves 53a. Operation of this modification is substantially the same as in Figure 3.

I claim:

1. In a flow control device, a body having inflow and outflow passages for flow of fluid, a tube of resilient material disposed within the body and having its ends sealed with respect to the body about the passages, a circularly contoured barrier disposed within the tube intermediate the ends of the same, the barrier having an annular peripheral surface of substantial width against which the adjacent annular portion of the tube is adapted to engage and seal, means disposed within the end portions of the tube on opposite sides of the barrier to prevent inward collapsing of the tube, means forming a closed annular fluid chamber about the tube, there being a duct communicating with the chamber for applying a controlling fluid under pressure to the same, a circular shoulder formed upon the periphery of the barrier and located between the inflow and outflow edges of the barrier, and a series of restricted passages formed in the barrier for flow of fluid, the passages communicating with the region about the periphery of the barrier at points located intermediate the shoulder and the outflow edge of the same, and also communicating with the outflow passage.

2. In a flow control device, a body having inflow and outflow passages for flow of liquid, a tube of resilient material disposed within the body and having its ends sealed with respect to the body about the passages, a circularly contoured barrier disposed within the tube intermediate the ends of the same, the barrier having an outer annular portion affording a peripheral surface of substantial width against which the adjacent annular portion of the tube is adapted to engage and seal, means disposed within the end portions of the tube on opposite sides of the barrier to prevent inward collapsing of the tube, a series of small circumferentially spaced passages formed in the annular portion of the barrier, one end of each passage communicating with the outflow passage and the other end of each passage communicating with an annular region surrounding the outer periphery of the barrier intermediate the inflow and outflow edges of the barrier, and a circular shoulder formed upon the outer periphery of the barrier and faced toward the outflow edge of the same, the shoulder being located in close proximity with the last mentioned ends of the passages.

3. In a flow control device, a body having inflow and outflow passages for flow of liquid, a tube of resilient material disposed within the body and having its ends sealed with respect to the body about the passages, a circularly contoured barrier disposed within the tube intermediate the ends of the same, the barrier having an outer annular portion affording a peripheral surface against which the adjacent annular portion of the tube is adapted to engage and seal, means disposed within the end portions of the tube on opposite sides of the barrier to prevent inward collapsing of the tube, a circular shoulder formed on the outer periphery of the barrier and faced toward the outflow edge of the same, said tube when pressed down upon the periphery of the barrier serving to engage and seal upon the edge of the shoulder and also serving to span an annular space about the barrier adjacent the outflow side of the shoulder, and a plurality of relatively small passages serving to vent said space.

4. In a flow control device, a body having inflow and outflow passages for flow of liquid, a tube of resilient material disposed within the body and having its ends sealed with respect to the body about the passages, a circularly contoured barrier disposed within the tube intermediate the ends of the same, the barrier having an outer annular portion affording a peripheral surface of substantial width against which the adjacent annular portion of the tube is adapted to engage and seal, grid means disposed within the end portions of the tube on opposite sides of the barrier to prevent inward collapsing of the tube, a circular shoulder formed on the outer periphery of the barrier and faced toward the outflow edge of the same, said tube when pressed down upon the periphery of the barrier serving to engage the outflow edge of the barrier and also to engage and seal upon the edge of the shoulder and to span an annular space located between the shoulder and the outflow edge of the barrier, and a plurality of circumferentially spaced holes formed in the barrier and having their outer ends communicating with said last named annular space, the aggregate cross-sectional area afforded by said holes being a minor fraction of the cross-sectional flow area afforded by the clearance between the tube and the barrier, when the tube is in full open position.

MARVIN H. GROVE.